(12) United States Patent
Canter et al.

(10) Patent No.: US 12,125,319 B2
(45) Date of Patent: *Oct. 22, 2024

(54) OPTICAL CHARACTER RECOGNITION OF VOTER SELECTIONS FOR CAST VOTE RECORDS

(71) Applicant: Hart InterCivic, Inc., Austin, TX (US)

(72) Inventors: James M. Canter, Austin, TX (US); Drew E. Tinney, Austin, TX (US); Ievgen Konovalenko, Austin, TX (US)

(73) Assignee: Hart InterCivic, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/381,091

(22) Filed: Oct. 17, 2023

(65) Prior Publication Data

US 2024/0046731 A1 Feb. 8, 2024

Related U.S. Application Data

(63) Continuation of application No. 17/483,627, filed on Sep. 23, 2021, now Pat. No. 11,830,294, which is a (Continued)

(51) Int. Cl.
*G07C 13/00* (2006.01)
*G06K 7/10* (2006.01)
(Continued)

(52) U.S. Cl.
CPC ......... *G07C 13/00* (2013.01); *G06K 7/10346* (2013.01); *G06K 17/0032* (2013.01);
(Continued)

(58) Field of Classification Search
CPC ...... G07C 13/00; G06V 30/40; G06V 30/262; G06V 30/10; G06K 7/10346; G06K 17/0032

See application file for complete search history.

(56) References Cited

U.S. PATENT DOCUMENTS 2,612,994 A    10/1949 Woodland et al.
3,609,685 A    9/1971 Deutsch
(Continued)

FOREIGN PATENT DOCUMENTS

BR    102013018558-2 A2    9/2014
BR    1020130185582    9/2014
(Continued)

OTHER PUBLICATIONS

Kim et al., "Improved Support For Machine-Assisted Ballot-Level Audits", Usenix Journal Of Election Technology And Systems (JETS), vol. 1, No. 1, Aug. 2013, 18 pgs.
(Continued)

*Primary Examiner* — Laura A Gudorf
(74) *Attorney, Agent, or Firm* — Egan, Enders & Huston LLP.

(57) ABSTRACT

An electronic voting system is described that utilizes printed vote records (PVRs) in which a voter's vote selections are recorded in voter readable characters. Optical character recognition (OCR) techniques may then be utilized to scan the PVR to record the voter's selections. The OCR data is then utilized to generate the cast vote record. Thus, the electronic voting system directly interprets the voter selections from the PVR just as the voter sees the data. In this manner "what you see is what you get" printed vote record data is provided for a voter's viewing and that same data is used to generate the cast vote record.

40 Claims, 4 Drawing Sheets

Related U.S. Application Data continuation of application No. 17/225,357, filed on Apr. 8, 2021, now abandoned, which is a continuation of application No. 16/919,267, filed on Jul. 2, 2020, now Pat. No. 11,004,292, which is a continuation of application No. 16/745,621, filed on Jan. 17, 2020, now Pat. No. 10,950,078, which is a continuation of application No. 16/560,222, filed on Sep. 4, 2019, now Pat. No. 10,573,111, which is a continuation of application No. 16/239,607, filed on Jan. 4, 2019, now Pat. No. 10,445,966.

(60) Provisional application No. 62/711,212, filed on Jul. 27, 2018.

(51) Int. Cl.
  *G06K 17/00* (2006.01)
  *G06V 30/10* (2022.01)
  *G06V 30/262* (2022.01)
  *G06V 30/40* (2022.01)

(52) U.S. Cl.
  CPC ............ *G06V 30/262* (2022.01); *G06V 30/40* (2022.01); *G06V 30/10* (2022.01)

(56) References Cited

U.S. PATENT DOCUMENTS

| | | | |
|---|---|---|---|
| 5,377,099 | A | 12/1994 | Miyagawa |
| 5,497,318 | A | 3/1996 | Miyagawa et al. |
| 5,625,721 | A | 4/1997 | Lopresti et al. |
| 5,703,972 | A | 12/1997 | Lopresti et al. |
| 5,726,435 | A | 3/1998 | Hara et al. |
| 5,748,807 | A | 5/1998 | Lopresti et al. |
| 5,764,799 | A | 6/1998 | Hong et al. |
| 5,850,480 | A | 12/1998 | Scanlon |
| 6,250,548 | B1 | 6/2001 | McClure et al. |
| 6,873,966 | B2 | 3/2005 | Babbitt et al. |
| 6,885,758 | B1 | 4/2005 | Bayer |
| 6,971,574 | B1 | 12/2005 | Herskowitz |
| 7,080,779 | B2 | 7/2006 | Cummings |
| 7,306,148 | B1 | 12/2007 | Morganstein |
| 7,406,201 | B2 | 7/2008 | Heilper et al. |
| RE40,449 | E | 8/2008 | Provitola et al. |
| 7,635,088 | B2 | 12/2009 | Chung et al. |
| 7,729,991 | B2 | 6/2010 | Rodriguez et al. |
| 7,988,047 | B2 | 8/2011 | Chung |
| 8,261,986 | B2 | 9/2012 | Chung et al. |
| 8,991,701 | B2 | 3/2015 | Bolton et al. |
| 9,165,417 | B2 | 10/2015 | Valles Fontanals et al. |
| 9,361,531 | B2 | 6/2016 | Stella |
| 9,401,059 | B2 | 7/2016 | Backert et al. |
| 10,002,481 | B2 | 6/2018 | Seibel et al. |
| 10,147,259 | B1 | 12/2018 | Dvorak |
| 10,445,966 | B1 | 10/2019 | Canter et al. |
| 10,573,111 | B2 | 2/2020 | Canter et al. |
| 10,950,078 | B2 | 3/2021 | Canter et al. |
| 2002/0072961 | A1* | 6/2002 | McDermott ............ G07C 13/00 705/12 |
| 2002/0084325 | A1 | 7/2002 | Reardon |
| 2005/0269406 | A1 | 12/2005 | Neff |
| 2006/0041468 | A1 | 2/2006 | Reardon |
| 2009/0166417 | A1 | 7/2009 | Dammann et al. |
| 2009/0256703 | A1 | 10/2009 | Bolton |
| 2009/0289115 | A1 | 11/2009 | Chung et al. |
| 2010/0114674 | A1 | 5/2010 | Daza Fernandez et al. |
| 2011/0202464 | A1 | 8/2011 | Carbullido |
| 2014/0012635 | A1 | 1/2014 | Joyce et al. |
| 2014/0231513 | A1 | 8/2014 | Brockhouse et al. |
| 2016/0019439 | A1 | 1/2016 | Wang |
| 2017/0344538 | A1 | 11/2017 | Horai |
| 2018/0102013 | A1 | 4/2018 | Spanos et al. |
| 2018/0350180 | A1 | 12/2018 | Onischuk |
| 2019/0213820 | A1 | 7/2019 | Sebes et al. |
| 2021/0225109 | A1 | 7/2021 | Canter et al. |
| 2022/0012970 | A1 | 1/2022 | Canter et al. |
| 2022/0012971 | A1 | 1/2022 | Canter et al. |

FOREIGN PATENT DOCUMENTS

| | | |
|---|---|---|
| WO | 0120562 A2 | 3/2001 |
| WO | 2004038632 | 5/2004 |
| WO | 2012175758 | 12/2012 |

OTHER PUBLICATIONS

Keller et al., "A PC-Based Open-Source Voting Machine With An Accessible Voter-Verifiable Paper Ballot", Usenix, 2005, 12 pgs.
Mohapatra et al., "Spell Checker For OCR", International Journal Of Computer Science And Information Technologies, vol. 4, No. 1, 2013, 7 pgs.
Bunke, "A Fast Algorithm For Finding The Nearest Neighbor Of A Word In A Dictionary", IAM-93-025, Nov. 1993, 16 pgs.
Hassan et al., "Language Independent Text Correction Using Finite State Automata", IBM Cairo Technology Development Center, 2008, 6 pgs.
Toledo, "Election Tally Sheets Processing System", IAPR Workshop, 2016, 5 pgs.
Ashford, "QR Codes And Academic Libraries: Reaching Mobile Users", Faculty Publications—George Fox University Libraries, 2010, 6 pgs.
Barrera, "Optical Encryption And QR Codes: Secure And Noise-Free Information Retrieval", Optics Express, 2013, 6 pgs.
Krawczyk et al., "HMAC: Keyed-Hashing For Message Authentication", Network Working Group, Feb. 1997, 11 pgs.
Essex et al., "Hover: Trustworthy Elections With Hash-Only Verification", IEEE Computer And Reliability Societies, 2012, 7 pgs.
Preneel, "The First 30 Years Of Cryptographic Hash Functions And The NIST SHA-3 Competition", Katholieke Universiteit Leuven and IBBT, Dept. Electrical Engineering, 2010, 15 pgs.
Shamos, "Electronic Voting Glossary", Carnegie Mellon University, 2011, 8 pgs.
Quesenbery, "Making Voting Universal (And Secure)", Civic Designing, Medium.com, Printed From Internet Jan. 2019, 9 pgs.
Unisyn Voting Solutions, OpenElect FreedomVote Tablet (FVT), The Freedom to Adapt; 2017, 2 pgs.
Election Systems & Software, ExpressVote XL, Full face Universal Voting System, 2016, 2 pgs.
Election Systems & Sofware, ExpressVote, Universal Voting System As A Marker, 2016, 2 pgs.
Petition For Post Grant Review Of U.S. Pat. No. 10,445,966, *Election Systems & Software, LLC.* v. *Hart InterCivic, Inc.*, 99 pgs.
Declaration Of Carlos Cezar Cordeiro Pires, *Election Systems & Software, LLC.* v. *Hart InterCivic, Inc.*, U.S. Pat. No. 10,445,966, 100 pgs.
Declaration Of Michael I. Shamos, Ph.D., J.D. *Election Systems & Software, LLC.* v. *Hart InterCivic, Inc.*, U.S. Pat. No. 10,445,966, 175 pgs.
Petitioner's Power Of Attorney, *Election Systems & Software, LLC.* v. *Hart InterCivic, Inc.*, U.S. Pat. No. 10,445,966, 3 pgs.
File History For U.S. Pat. No. 10,445,966, 172 pgs.
Canter et al., "Optical Character Recognition Of Voter Selections For Cast Vote Records", U.S. Appl. No. 16/745,621, filed Jan. 17, 2020, 22 pgs.
*Election Systems & Software, LLC.* v. *Hart InterCivic, Inc.*, U.S. Pat. No. 10,445,966, Decision Granting Institution Of Post-Grant Review 35 U.S.C. § 324, 37 C.F.R. § 42.4, Sep. 2, 2020, 48 pgs.
Certified Translation of Brazil Patent Document BR-102013018558-2 A2, Nadaf, "Verification Ballot Printing And Collection Equipment And Equipment For Auditing And Counting Votes Printed On Verification Ballots For A Mechatronic Voting Model", Filed Jul. 19, 2013, 158 pgs.
*Election Systems & Software, LLC.* v. *Hart Intercivic, Inc.*, "Petitioner's Reply To Patent Owner's Response", U.S. Pat. No. 10,445,966, Feb. 17, 2021, 38 pgs.

(56) References Cited

OTHER PUBLICATIONS

*Election Systems & Software, LLC.*v. *Hart Intercivic, Inc.*, "Video Conference Deposition Of Daniel P. Lopresti, Ph.D." U.S. Pat. No. 10,445,966, Feb. 5, 2021, 87 pgs.
Federal Information Processing Standards Publication, "Digital Signature Standard (DSS)", Information Technology aboratory, FIPS PUB 186-4, Jul. 2013, 130 pgs.
*Election Systems & Software, LLC.* v. *Hart Intercivic, Inc.*, "Supplemental Declaration Of Michael I. Shamos, Ph.D., J. D.", U.S. Pat. No. 10,445,966, Feb. 17, 2021, 34 pgs.
Esakov et al., "Issues In Automatic OCR Error Classification", Panasonic Technologies, Inc., Dec. 31, 1994, 12 pgs.
Damerau, "A Technique For Computer Detection And Correction Of Spelling Errors", Communications Of The ACM, vol. 7, No. 3, Mar. 1964, 6 pgs.
Seni et al., "Generalizing Edit Distance To Incorporate Domain Information: Handwritten Text Recognition As A Case Study", Pattern Recognition, vol. 29, No. 3, 1996, 10 pgs.
Written Decision, *Election Systems & Software, LLC.* v. *Hart InterCivic, Inc.*, PGR2020-00031, U.S. Pat. No. 10,445,966, 86 pgs.

* cited by examiner

OPTICAL CHARACTER RECOGNITION OF VOTER SELECTIONS FOR CAST VOTE RECORDS

This application claims priority to U.S. patent application Ser. No. 17/483,627 filed Sep. 23, 2021 which claims priority to U.S. patent application Ser. No. 17/225,357 filed Apr. 8, 2021 which claims priority to U.S. patent application Ser. No. 16/919,267 filed Jul. 2, 2020, now U.S. Pat. No. 11,004,292, which claims priority to U.S. patent application Ser. No. 16/745,621 filed Jan. 17, 2020, now U.S. Pat. No. 10,950,078, which claims priority to U.S. patent application Ser. No. 16/560,222 filed Sep. 4, 2019, now U.S. Pat. No. 10,573,111, which claims priority to U.S. patent application Ser. No. 16/239,607 filed Jan. 4, 2019, now U.S. Pat. No. 10,445,966, which claims priority to Provisional Patent Application No. 62/711,212 filed Jul. 27, 2018, the disclosures all of which are expressly incorporated herein by reference.

BACKGROUND OF THE INVENTION

The present disclosure relates to the voting systems for elections. More specifically, it provides a system and method for providing paper records of voter selections and generating cast vote records from those paper records.

A variety of electronic voting systems are well known. Electronic systems include, for example, direct recording electronic (DRE) voting systems that electronically record votes to directly create an electronic cast vote record. Electronic systems also include, for example, systems in which paper vote records are generated based on a voter's electronic vote selections, with the paper vote record then being scanned for creation of the electronic cast vote record and electronic tabulation. As used herein, an electronic cast vote record is an electronic record that indicates the determined voter's choice or selection in a manner determined in accordance with the voting system. Thus, an electronic cast vote record is an electronic record of a voter's cast voting selections and may be used in the vote tabulation process.

The use of paper records in an electronic voting allows the creation of a paper trail of voter selections, for example for use by an elections office for audit purposes. Such voting systems have also been called "hybrid voting" as it is a cross between all electronic DRE voting and paper-based hand-marked ballots. Such hybrid systems provide an electronic voting system in which a printed vote record (PVR) is produced (allowing a paper record to be an official record), and then the PVR is scanned on a digital scanner for cast vote record creation. The PVR may be full sized sheets of paper (for example standard 8.5×11 inch or 8.25×14 inch paper stock) or may be other specialized sizes. Traditionally, the PVR contains a barcode that is encoded with the voter's vote selections. The barcode is then scanned with a scanner and decoded to generate the electronic cast vote record. It has been found though, that some voters may find such a process to lack transparency as the voter cannot readily review the barcode to confirm the encoded data matches the voter's vote selections.

It would be desirable to provide an electronic voting system that utilizes PVRs in a manner that provides better transparency to the voter.

SUMMARY OF THE INVENTION

In one embodiment, the present disclosure describes an electronic voting system that utilizes printed vote records (PVRs) in which a voter's vote selections are recorded in voter readable characters. Optical character recognition (OCR) techniques may then be utilized to scan the PVR to record the voter's selections. The OCR data is then utilized to generate the cast vote record. Thus, the electronic voting system directly interprets the voter selections from the PVR just as the voter sees the data. In this manner "what you see is what you get" printed vote record data is provided for a voter's viewing and that same data is used to generate the cast vote record.

Further, the OCR process utilized accounts for and corrects for potential OCR errors. In one embodiment, an election dictionary is provided of the potential vote choices. Thus, for example, candidate names may be entered into the election dictionary and utilized for pattern matching to the OCR results. To further ensure accuracy (and address candidates which may have the same or similar names), the sequence number affiliated with a particular candidate may be utilized. Further, the line number (or even the contest title itself) on the PVR may also be utilized as a contest identifier. In one embodiment, the OCR'ed name and additional data may be utilized together as the key into the election dictionary. The additional data may be data related to a candidate, but being more than just the candidate name. For example, in some embodiments, the additional data may be the sequence number and/or line number data. Thus, for example, the OCR'ed name and sequence number, the OCR'ed name and line number, or the OCR'ed name, sequence number and line number may be utilized together as the key into the election dictionary. In addition, a long string matching algorithm may be utilized to provide error detection to the string. In one embodiment, the Levenshtein distance algorithm may be utilized for such string error detection. More specifically, the Levenshtein technique is used for error detection and the calculation of a "distance" between the OCR data and each key in the dictionary. If a calculated distance is below a defined threshold, then the data is matched to that dictionary entry. Then as described below, a hash check indicates if all of the matches were correct. In this manner, OCR data errors may be eliminated leading to a more robust OCR result which may be used for the subsequent generation of a cast vote record.

Further, to ensure the PVR is valid and/or has not been altered after printing, a barcode is also provided on the PVR. The barcode includes a single digitally signed hash that may be generated by using a secure hash function to indicate the PVR is valid and a one way hash of the voter's vote selections. As part of the scanning process, the optical character recognition results may be generated and then verified by use of another hash process. More specifically, a hash produced from the OCR generated characters may be compared to the hash provided in the barcode. Such techniques confirm that the PVR was printed from a known source and that the PVR has not been altered from its original state. In this manner, a counterfeit PVR or a PVR that has had its characters altered may be detected. Moreover, if the PVR was improperly or tampered with when printed this technique may detect such tampering.

To further ensure the accuracy of the OCR process, additional processing beyond traditional OCR processes may also be utilized for recognizing the characters presented on the PVR.

In one embodiment, a method for electronic voting using printed vote records is provided. The method comprises recording a voter's vote selections and generating a printed vote record of the voter's vote selections, the printed vote record containing voter readable text indicating the voter's vote selections. The method further comprises scanning the printed vote record, the scanning including scanning the voter readable text. The method also includes utilizing optical character recognition (OCR) on the scanned voter readable text to create a data set which identifies the voter's vote selections and generating a cast vote record from the data set so that voter selections in the cast vote record are based on the voter readable text.

In another embodiment, a method for electronic voting using printed vote records is provided. The method may comprise recording a voter's vote selection with a ballot marking device and generating a printed vote record of the voter's vote selections, the printed vote record containing voter readable text including a candidate name of a voter's vote selection. The method further comprises electronically scanning the printed vote record, the scanning including scanning the candidate name. The method also includes utilizing optical character recognition (OCR) on the scanned candidate name to create a first data set. The method further comprises comparing the first data set with an election dictionary and generating a cast vote record based on the comparing of the first data set with the election dictionary so that voter selections in the cast vote record are based on is based at least in part on the scanned candidate name.

In yet another embodiment, a method for electronic voting using printed vote records is provided. The method comprises recording a voter's vote selections and generating a printed vote record of the voter's vote selections, the printed vote record containing voter readable text indicating the voter's vote selections, the printed vote record further including a bar code. The method further comprises electronically scanning the printed vote record, the electronical scanning including scanning the voter readable text and scanning the bar code. The method also includes utilizing optical character recognition (OCR) on the scanned voter readable text to create a data set which identifies the voter's vote selections and generating a cast vote record from the data set so that voter selections in the cast vote record are based on the voter readable text.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

Figure 1:
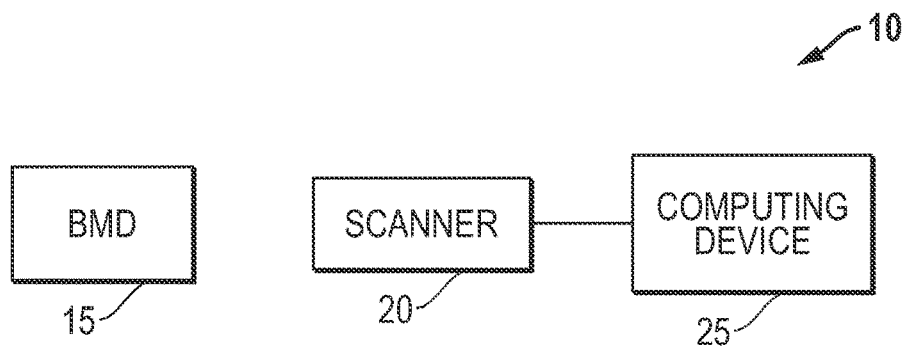
FIG. 1 illustrates an exemplary voting system for utilizing the techniques described herein.

FIG. 1 illustrates one exemplary embodiment of a voting system for utilizing the techniques described herein. It will be recognized, however, that the techniques described herein may be utilized in a wide range of other voting systems. As shown in FIG. 1, a voting system 10 that may be located at a polling location includes a ballot marking device (BMD) 15, a scanner 20 and a computing device 25. In one embodiment of a voting process, a polling official and/or the voter may activate a voting session on the BMD 15 (in one example by providing an access code to a voter to access the BMD 15). After activation, the voter may then make voting selections on the BMD 15. When the voter has completed their selections, the BMD 15 may then print out a PVR of the voter's voting selections. As described above and explained in more detail below, the voter's selections may be indicated on the PVR using readable characters so that the voter may visually confirm their voting selections, thus providing voting transparency to the voter. The voter may then enter the PVR into a scanner 20 which provides a scanned image of the PVR. The scanner 20 may provide that scanned image of the PVR to a computing device 25 which is connected to the scanner 25. The computing device may then perform an OCR process on the scanned image. The computing device 25 may also provide improved accuracy and/or error correction of the OCR by utilizing data processing techniques that are described herein to enhance the conversion of the scanned image to usable data. The scanning hardware for the scanner 20 may be conventional scanning hardware. However, as described in more detail below, specialized data analysis of the scanned information may be provided to improve the integrity and reliability of the scan. Such data analysis may be accomplished with the computing device 25. The computing device may then generate an electronic cast vote record associated with the voter's selections. It will be recognized that the functionality of the computing device may alternatively be integrated within the scanner 20. The BMD 15, scanner 20 and computing device 25 may each be separate non-integrated devices. Alternatively, all or some of the functionality of these devices may be integrated together within one device.

Figure 2:
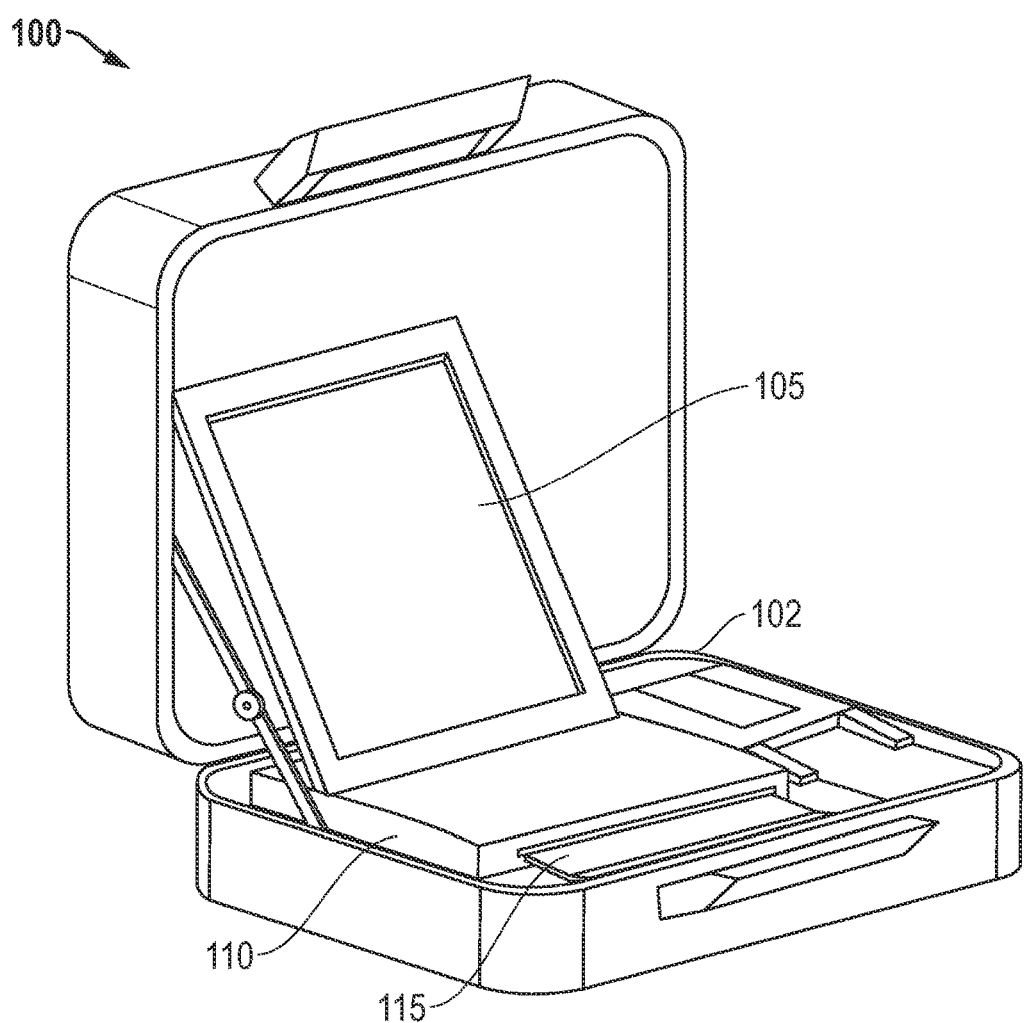
FIG. 2 illustrates an exemplary ballot marking device for utilizing the techniques described herein.

FIG. 2 illustrates an exemplary BMD. However, it will be recognized that a wide range of other BMDs may be utilized while still achieving the advantages of the voting process described herein. The BMD 100 of FIG. 2 includes a display 105, a voting processing unit 110 and a printer medium input tray 115. The voting processing unit 110 may include a variety of hardware and software, including a memory, processors, associated election software, input devices, etc., all as is known in the art. In operation, a voter may utilize the BMD 100 as part of the process of casting a vote in an election. The voter may be provided instructions and voting choices that are presented on the display 105 of the BMD 100. Various voter responses and election selections may be entered via the display (in the case of a touchscreen display) or may entered via other inputs such as a keypad, buttons, dials, etc. that may be part of the voting processing unit 110. The BMD 100 also includes an internal printer (not shown). The printer may be utilized to print a voter's selections on a PVR. In one embodiment, the printer may be a thermal printer and the PVR may be printed on thermal paper. In operation, a voter uses the BMD 100 to generate a PVR. The PVR may then be scanned and processed as described elsewhere herein to create an electronic cast vote record. As described herein, the PVR may be utilized not only as part of the cast vote record generation process, but also as a tool for the voter to inspect the generated vote selections prior to casting the voter selections through the scanning process.

As described herein, the BMD may be a hybrid voting device that combines electronic voting features with the production of a PVR. Such a technique allows voting transparency to the voter and provides the election officials a paper record which may be used for audit or other purposes. The PVR may be a full sheet of standard paper stock or may be other customized sizes. As described herein, OCR may be used to determine the voter selections with the add-on of additional data process techniques to ensure data accuracy of the OCR process and ensure validity of the PVR.

As mentioned, OCR techniques may be utilized to scan the PVR to record the voter's selections. The OCR data is then utilized to generate the cast vote record. Thus, the electronic voting system directly interprets the voter selections from the PVR just as the voter sees the data. In this manner "what you see is what you get" printed vote record data is provided for a voter's viewing and that same data is used to generate the cast vote record.

Further, the OCR process utilized accounts for and corrects for potential OCR errors. In one embodiment, an election dictionary is provided of the potential vote choices. Thus, for example, candidate names may be entered into the election dictionary and utilized for pattern matching to the OCR results. To further, ensure accuracy (and address candidates that have the same or similar names) additional information beyond just the candidate name be utilized for comparison to the election dictionary. Thus, in one embodiment, the OCR'ed name and additional data may be utilized together as the key into the election dictionary. The additional data may be data related to a candidate, but being more than just the candidate name. For example, in some embodiments, the additional data may be the sequence number data affiliated with a candidate. The additional data may also be line number data affiliated with a contest, and/or the contest name itself. Thus, for example, the OCR'ed name and sequence number, the OCR'ed name and line number, or the OCR'ed name, sequence number and line number may be utilized together as the key into the election dictionary. It will be recognized that other combinations of a candidate name and additional data may also be used.

In addition a long string matching algorithm may be utilized to provide error detection to the string. In one embodiment, the Levenshtein distance algorithm may be utilized for such string error detection. More specifically, the Levenshtein algorithm is used for error detection and the calculation of a "distance" between the OCR data and each key in the dictionary. If a calculated distance is below a defined threshold, then the data is matched to that dictionary entry. Then as described below, a hash check indicates if all of the matches were correct. In this manner, OCR data errors may be minimized and a more robust OCR result may be obtained and used for the subsequent generation of a cast vote record.

The scanned data for write-in candidates may be treated somewhat differently as the names of write-in candidates may not be available before the voting process for entry in an election dictionary to use in the OCR post-processing steps as described above. In one embodiment, write-in data may be saved in two parts as part of the cast vote record. First, a PNG snippet of the entered write-in data (a photo "snapshot") may be stored as part of the cast vote record. Second, the OCR digital results of the write-in data are also stored. Both parts may then be included in the cast vote record and uploaded for tabulation. When the election office processes write-in votes, the election office will have the digital OCR data side by side with the write-in image so that manual adjudication (if desired) may be accomplished. In one embodiment, further additional back office write-in candidate data verification may be accomplished if the election office generates a certified write-in candidate list. More particularly, the names from the certified write-in candidate list may be entered into the back office post-processing computer systems and then used in the same manner that the election dictionary described above is used to provide enhanced accuracy to the OCR results for write-in candidates.

Further, to ensure the PVR is valid and/or has not been altered after printing, a barcode is also provided on the PVR. The barcode includes a single digitally signed hash that may be generated using a secure hash function to indicate the PVR is valid and a one way hash of the voter's vote selections. As part of the scanning process, the optical character recognition results may be generated and then verified by use of another hash process. More specifically, a hash produced from the OCR generated characters may be compared to the hash provided in the barcode. Such techniques confirm that the PVR was printed from a known source and that the PVR has not been altered from its original state. In this manner, a counterfeit PVR or a PVR that has had its characters altered may be detected. Moreover, if the PVR was improperly or tampered with when printed, this technique can detect such tampering. It is noted that the barcode is used to confirm data accuracy and PVR integrity but, in one embodiment does not have to be used to determine voter selections. The barcode could be any of a wide range of barcode types, including for example, one dimensional barcodes or a matrix two-dimensional barcode (such as for example a QR code). Further, though described as one barcode, it will be recognized that the barcode may be split across multiple barcodes as well. For example, each barcode could serve as a landmark and the found barcode positions could be used to correct for scanning skew.

Figure 3:
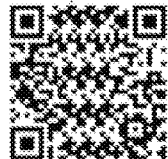
FIG. 3 illustrates an exemplary printed vote record generated by the ballot marking device.

An exemplary PVR provided by the BMD 100 of FIG. 2 is shown in FIG. 3. As shown in FIG. 3, a PVR 300 is provided. The PVR may include a header region 310 in which a variety of information may be printed. In one example, the header region 310 may include instructions to the voter, information regarding the election, a PVR number, page information, etc. As shown, in one embodiment a barcode 320 may be provided in the header region. In the example shown, the barcode is in the form of a QR code; however, other barcodes may be utilized. As described above, the barcode may be used to confirm data accuracy and/or PVR integrity but, in the exemplary embodiment, is not used to determine voter selections. The election voting contests may be shown in the contest section 330 of the PVR 300 as shown. Further, the voter's selections may be shown in the voter selection section 340 of the PVR 300 as shown. As seen in FIG. 3, the voter selections are provided in a character form that is readable by the voter. Thus, voting transparency is provided to the voter such that the voter can confirm the PVR matches the selections entered by the voter on the BMD 100.

The contents of the barcode 320 may contain a wide variety of information including metadata content and hash data content. In one exemplary embodiment, the metadata content may include, but is not limited to a PVR barcode version, an election ID number, other unique ID numbers, an election version, precinct split sequence number, party sequence number, a crossover ballot flag, provisional ballot flag, official versus test ballot flag, accessibility settings, sheet number, sequence number of the first contest on the sheet, the number of lines on the sheet, etc. One use of the hash content is to ensure all voter selections were read correctly. Another use of the hash content is to verify the validity of the PVR itself. The hash may cover, in one embodiment, ballot metadata sections and all printed data in the voter selection section 340.

Thus, the barcode uses a single digitally signed hash that can be used for multiple purposes. First, the single digitally signed hash may be used to ensure the source origin of the PVR (that it came from the BMD 100), since it is a digital signature. In addition, the one way hash of voter selections provided in the barcode can be used to for a comparison to a hash of the OCR voter selections. The comparison of the one way hash of the barcode to the hash of OCR results can confirm that the PVR was not edited after printing. For example, if a voter's selection was edited on the PVR after printing from a first candidate name to a second candidate name, the OCR process would decode the second candidate name, but when hash checked, the first candidate name would have been utilized to create the barcode hash, and thus the hash check would fail. In this manner, though the barcode contains a hash of the voter selection data, the barcode does not contain the original voter selection data itself.

Figure 4:
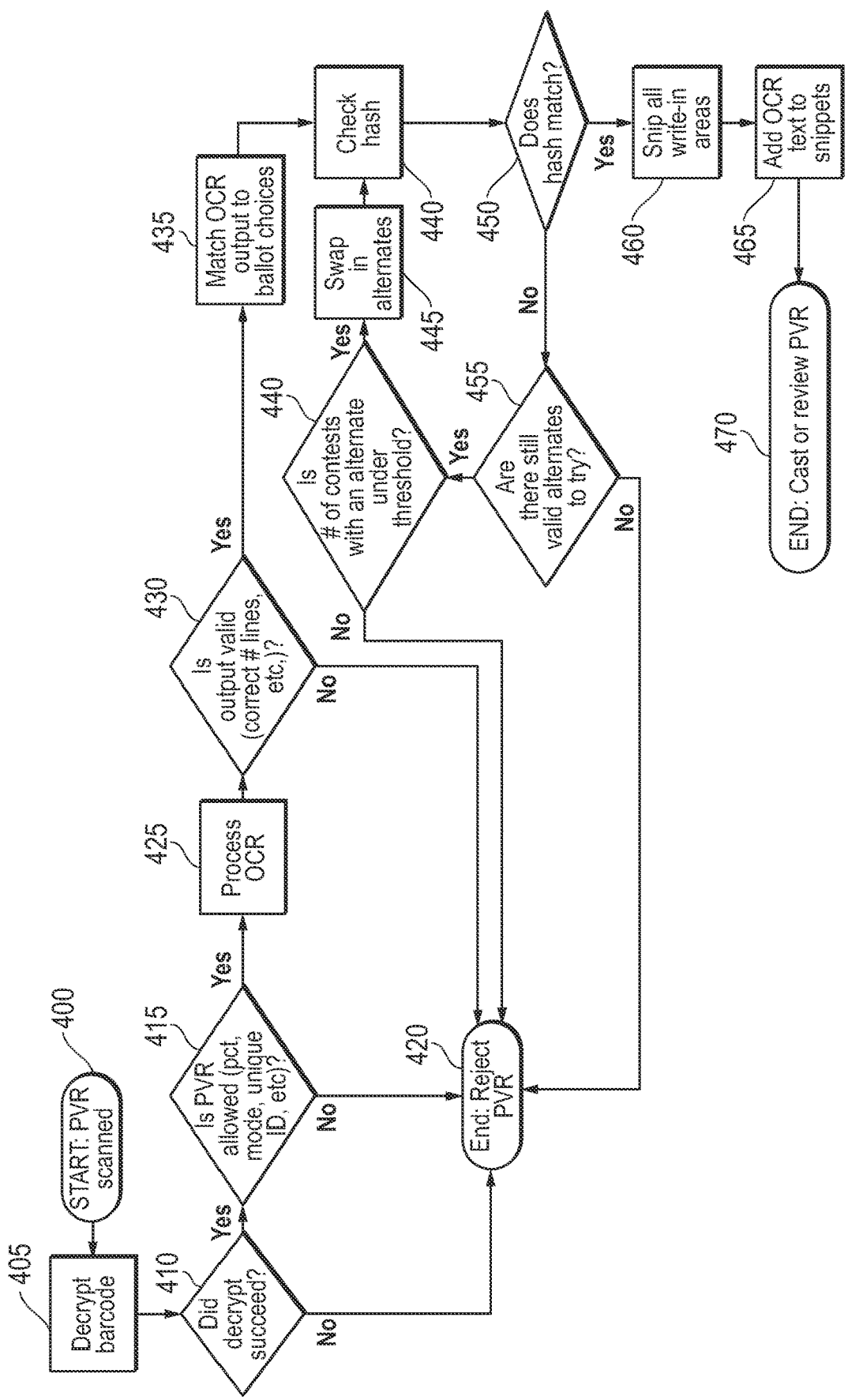
FIG. 4 illustrates an exemplary printed vote record process flow utilizing the techniques described herein.

FIG. 4 illustrates one exemplary PVR processing workflow utilizing a PVR such as PVR 300 of FIG. 3. It will be recognized that the workflow of FIG. 4 is merely one exemplary workflow and many other workflows may utilize the techniques disclosed herein. As shown in the workflow of FIG. 4, a scanned PVR is analyzed in accordance with the flow diagram of the workflow starting with a PVR scan and ending with either a rejected ballot or a cast or review of the ballot. As shown in FIG. 4, the workflow starts with step 400 of starting a PVR scan. Next, at step 405 the barcode is decrypted and at step 405 it is determined if the decrypt succeeded. It the decryption was successful the workflow proceeds to step 415. If the decryption was not successful the workflow proceeds to step 420 where the workflow ends and the PVR is rejected. At step 515, the PVR is analyzed to determine if it is allowed. If the PVR is allowed the workflow proceeds to step 425 and if the PVR is not allowed, the workflow proceeds to step 420 where the workflow ends and the PVR is rejected. At step 425, the PVR is subjected to an OCR process. At step 430, the output of the OCR is analyzed to confirm it has a valid output (for example the correct number of lines, etc.). If no, the workflow proceeds to step 420 where the PVR is rejected. If yes, the workflow proceeds to step 435.

At step 435 the OCR data is matched to the ballot choices. Then at step 440 the hash is checked and if the hash matches at step 450 the workflow proceeds to step 460. If the hash does not match the process proceeds to step 455 where it is determined if there are still valid alternatives to try. If there are no valid alternatives to try, the workflow proceeds from step 455 to step 420 where the PVR is rejected. If there are valid alternatives to try at step 455, the workflow proceeds to step 440 it is determined if the number of contests with an alternate is under a threshold. If the answer is no at step 440, workflow to step 420 where the PVR is rejected. If the answer is yes at step 440, workflow proceeds to step 445 where alternates are swapped in. Workflow then proceeds again to step 440 and steps 440 and 450 are performed again as described above. At step 460, all write-in areas are snipped. From step 460, the process proceeds to step 465 to add OCR text to snippets and then the process ends at step 470 where the PVR is cast or reviewed.

Figure 5:
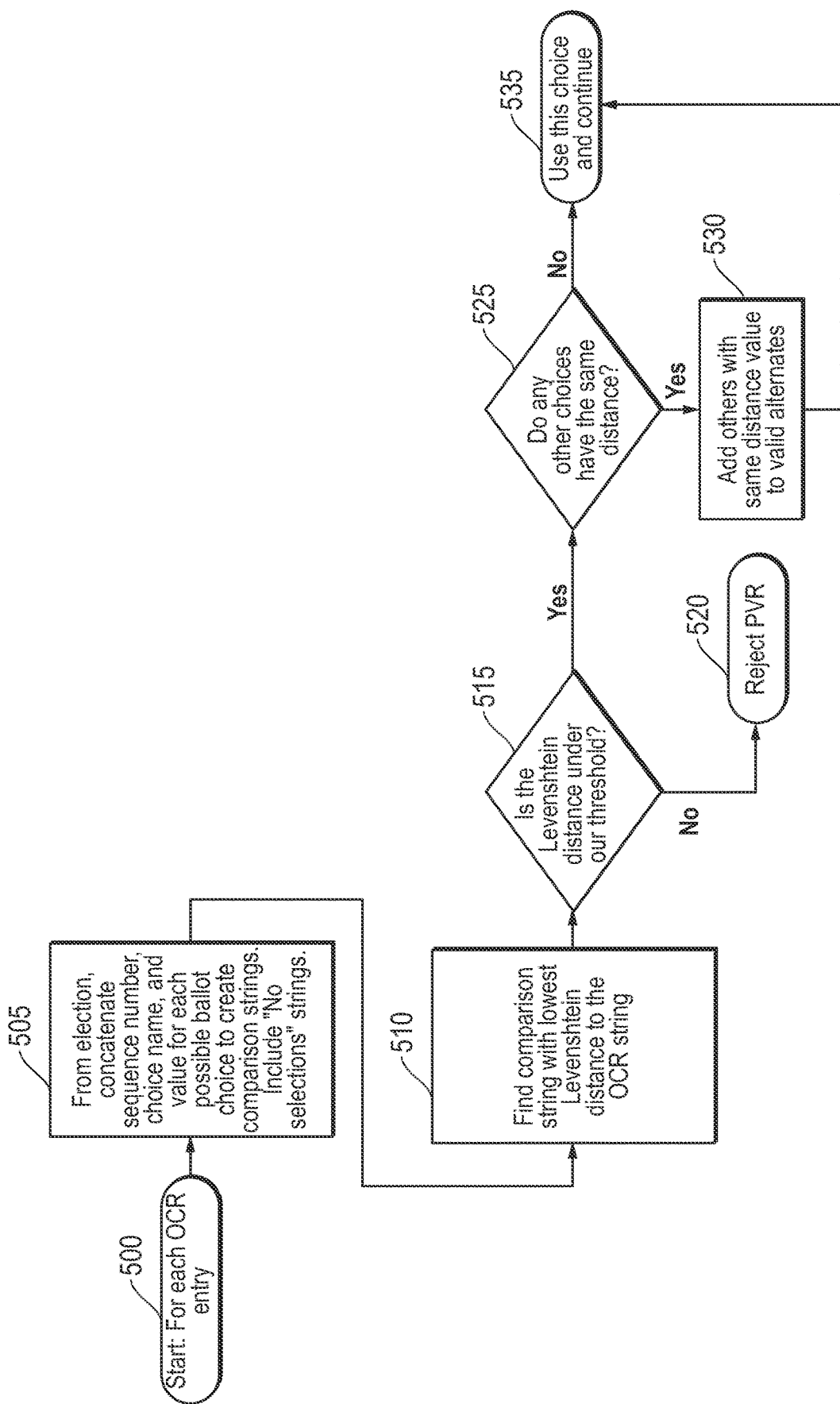
FIG. 5 illustrates an exemplary process flow for matching OCR data to ballot choices.

It is noted that, as part of the workflow of FIG. 4, a process step occurs that matches the OCR data to ballot choices, for example at step 435 of FIG. 4. Details regarding this process step are shown in more detail in FIG. 5. It will be recognized that the workflow of FIG. 5 is merely one exemplary matching workflow and many other workflows may utilize the techniques disclosed herein. As shown in FIG. 5, a process is shown for ballot choice matching for each OCR entry. As shown in step 500, the workflow of FIG. 5 beings with an OCR entry. At step 505, the workflow concatenates the choice name and additional data (in this example a sequence number) and the value for each possible ballot choice to create comparison strings. Note, this may include "no selection" strings to account for the situation where no selection is made by the voter. Then at step 510, the process finds the comparison string with the lowest Levenshtein distance to the OCR string. Next at step 515, it is determined if the Levenshtein distance is under a threshold. If yes, the process proceeds to step 525. If no, the process proceeds to step 520 and the printed vote record is rejected. At step 525 it is determined if any other chances have the same distance. If no, the process proceeds to step 535. If yes, the process proceeds to step 530. At step 535 the choice provided is used and the process proceeds as shown in FIG. 4 and described above. At step 530, the other choices are added to the valid alternatives list and the process then proceeds to step 535.

Thus, as described herein, a PVR is provided that is readable by a voter. Further, the readable text is utilized to generate an electronic cast vote. By being readable, full voter verification of a voter's vote selections is provided in a format that provides transparency to the voting process. An OCR process is performed on the PVR and the output of the OCR process is further processed in order to ensure data integrity and reliability. In one embodiment, an election dictionary is provided of the potential vote choices and the election dictionary and other data on the PVR is utilized to provide reliable matching of the OCR results with the proper ballot choice. A barcode and hash process may further be utilized to ensure PVR integrity and security. Thus, a voter's choices are shown in text and OCR techniques are utilized while a barcode is utilized for PVR and choice verification. In this manner, a secure, reliable and transparent voting workflow is provided.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms and methods of the invention herein shown and described are to be taken as presently preferred embodiments. Equivalent techniques may be substituted for those illustrated and described herein and certain features of the invention may be utilized independently of the use of other features, all as would be apparent to one skilled in the art after having the benefit of this description of the invention.

What is claimed is:

1. A method for electronic voting using printed vote records, comprising:
   generating a printed vote record of at least one vote selection of a voter;
   providing, on the printed vote record, voter readable text indicating the voter's at least one vote selection;
   electronically capturing information from the printed vote record;
   using optical character recognition (OCR) on at least a portion of the electronically captured information to generate a first data set, the first data set based at least in part on the voter readable text indicating the voter's at least one vote selection;

comparing the first data set to a second data set, the second data set obtained from the printed vote record; and generating a cast vote record, which is to be a stored record of all of the voter's final vote selections and to be the voter's casted vote used for vote tabulation, the cast vote record indicating the voter's at least one vote selection, wherein, prior to generating any cast vote record which is to be a stored record of all of the voter's final vote selections and to be the voter's casted vote used for vote tabulation, an accuracy of data to be cast is confirmed based at least in part on a comparison of the first data set and the second data set.

2. The method of claim 1, wherein the printed vote record further comprises encoded data based at least in part on the voter's at least one vote selection, and wherein the second data set is generated at least in part from the encoded data.

3. The method of claim 2, wherein electronically capturing information from the printed vote record includes capturing the encoded data.

4. The method of claim 1, wherein the electronically capturing information from the printed vote record comprises electronically scanning the voter readable text.

5. The method of claim 4, wherein the printed vote record further comprises encoded data based at least in part on the voter's at least one vote selection, and wherein the electronically capturing information from the printed vote record further comprises electronically scanning the encoded data.

6. The method of claim 5, wherein the encoded data is contained in a visual representation of encoded data.

7. The method of claim 1, wherein the information captured from the printed vote record comprises the voter readable text indicating the voter's at least one vote selection and other information.

8. The method of claim 7, wherein the other information is contained in a bar code.

9. The method of claim 7, wherein the second data set is based at least in part on the other information.

10. The method of claim 1, wherein electronically capturing information from the printed vote record comprises capturing an image of the printed vote record.

11. The method of claim 1, wherein the cast vote record provides the voter's sole casted vote used for vote tabulation.

12. The method of claim 11, wherein the information captured from the printed vote record comprises the voter readable text indicating the voter's at least one vote selection and other information.

13. The method of claim 12, wherein the other information is contained in a bar code.

14. The method of claim 12, wherein the second data set is based at least in part on the other information.

15. A method for electronic voting using printed vote records, comprising:
generating a printed vote record of at least one vote selection of a voter;
providing, on the printed vote record, voter readable text indicating the voter's at least one vote selection;
electronically capturing first information from the printed vote record;
using optical character recognition (OCR) on the first information to generate a first data set, the first data set based at least in part on the voter readable text indicating the voter's at least one vote selection;
electronically capturing second information from the printed vote record, to generate a second data set, the second information comprising encoded data;

comparing the first data set to a second data set; and
generating a cast vote record indicating the voter's at least one vote selection, the cast vote record being a stored record of all of the voter's final vote selections, wherein, prior to generating any cast vote record which is to be a stored record of all of the voter's final vote selections, an accuracy of data to be cast is confirmed based at least in part on a comparison of the first data set and the second data set.

16. The method of claim 15, wherein the encoded data is contained in a visual representation of encoded data.

17. The method of claim 15, further comprising confirming an accuracy of an optical character recognition (OCR) by utilizing a first hash produced from the first data set.

18. The method of claim 15, further comprising confirming an accuracy of an optical character recognition (OCR) by comparing a first hash produced from the first data set to a second hash, wherein the second hash is at least part of the encoded data.

19. The method of claim 15, wherein the comparison of the first data set and the second data set is used to confirm an accuracy of an optical character recognition (OCR) process by confirming that the at least one vote selection that the first data set is based at least in part on matches the at least one vote selection that the second data set is based at least in part on.

20. The method of claim 15, wherein the cast vote record is based on the first data set.

21. The method of claim 15, wherein using optical character recognition (OCR) on the first information to generate a first data set further comprises recursively modifying an OCR process applied to the voter readable text.

22. The method of claim 21, wherein after the cast vote record is generated, the cast vote record is utilized during a tabulation of an election.

23. The method of claim 15, wherein the cast vote record provides the voter's sole casted vote used for vote tabulation.

24. The method of claim 23, further comprising confirming an accuracy of an optical character recognition (OCR) by utilizing a first hash produced from the first data set.

25. The method of claim 23, further comprising confirming an accuracy of an optical character recognition (OCR) by comparing a first hash produced from the first data set to a second hash, wherein the second hash is at least part of the encoded data.

26. The method of claim 23, wherein the comparison of the first data set and the second data set is used to confirm an accuracy of an optical character recognition (OCR) process by confirming that the at least one vote selection that the first data set is based at least in part on matches the at least one vote selection that the second data set is based at least in part on.

27. The method of claim 23, wherein the cast vote record is based on the first data set.

28. The method of claim 27, wherein using optical character recognition (OCR) on the first information to generate a first data set further comprises recursively modifying an OCR process applied to the voter readable text.

29. An electronic voting system for using printed vote records, comprising:
a printer configured to generate a printed vote record of at least one vote selection of a voter, the printed vote record including voter readable text indicating the voter's at least one vote selection;
a scanner configured to (1) electronically capture first information from the printed vote record, the first information including the voter readable text, and (2) electronically capture second information from the printed vote record, the second information comprising encoded data; and a processor configured to (1) use optical character recognition (OCR) on the first information to generate a first data set based at least in part on the voter readable text indicating the voter's at least one vote selection, (2) generate a cast vote record which is to be a stored record of all of the voter's final vote selection indicating the voter's at least one vote selection based on the first data set and which is to be the voter's casted vote used for vote tabulation, and (3) generate a second data set from the second information, and wherein, the processor is further configured such that prior to generating the cast vote record which is to be a stored record of all of the voter's final vote selections and to be used for vote tabulation, an accuracy of data to be cast is confirmed based at least in part on a comparison of the first data set and the second data set.

30. The system of claim 29, wherein the processor is configured to recursively modify the first data set.

31. The system of claim 29, wherein the processor is further configured to generate an OCR hash from the first data set, and to compare the OCR hash to an encoded hash extracted from the encoded data on the printed vote record.

32. The system of claim 31, wherein the processor is configured to recursively modify the first data set by generating an additional OCR hash for comparison to the encoded hash until the additional OCR hash matches the encoded hash.

33. The system of claim 31, wherein the processor is configured to recursively modify the first data set by, in response to a mismatch between the OCR hash and the encoded hash, selecting a valid alternate OCR output.

34. A method for electronic voting using printed vote records, comprising:

generating a printed vote record of at least one vote selection of a voter;

providing, on the printed vote record, voter readable text indicating the voter's at least one vote selection;

electronically capturing first information from the printed vote record;

using optical character recognition (OCR) on the first information to generate a first data set, the first data set based at least in part on the voter readable text indicating the voter's at least one vote selection;

electronically capturing second information from the printed vote record, to generate a second data set, the second information comprising encoded data;

comparing the first data set to a second data set;

confirming an accuracy of the at least one vote selection of the voter based at least in part on a comparison of the first data set and the second data set;

after confirming an accuracy of the at least one vote selection, generating a cast vote record which is to be a stored record of all of the voter's final vote selections and which is to be the voter's casted vote used for vote tabulation, the cast vote record indicating the voter's at least one vote selection as determined by the first data set; the cast vote record being generated after the comparing the first data set and the second data set; and tabulating an election utilizing the cast vote record before vote auditing.

35. The method of claim 34, wherein comparing the first data set to the second data set comprises comparing a first hash produced from the first data set to a second hash extracted from the encoded data on the printed vote record.

36. The method of claim 35, further comprising recursively modifying the first data set, prior to generating the cast vote record.

37. The method of claim 36, wherein the recursively modifying the first data set comprises generating an additional OCR hash for comparison to a second hash extracted from the encoded data on the printed vote record, until the additional OCR hash matches the second hash.

38. The method of claim 35, wherein recursively modifying the first data set further comprises: based on the comparison of the first data set to the second data set, selecting a valid alternate OCR output based on the OCR process applied to the voter readable text.

39. The method of claim 34, further comprising utilizing the printed vote record for auditing the election, the auditing of the election being separate from the tabulation of the election.

40. The method of claim 34, wherein the cast vote record provides the voter's sole casted vote used for vote tabulation.

* * * * *